Nov. 15, 1960      G. J. BROWN      2,960,302
FLEXURE GIMBAL

Filed Oct. 29, 1957      6 Sheets-Sheet 1

George J. Brown
INVENTOR

By Forrest J. Lilly
Attorney

Nov. 15, 1960

G. J. BROWN 2,960,302

FLEXURE GIMBAL

Filed Oct. 29, 1957

George J. Brown
INVENTOR

BY Forrest J. Lilly

ATTORNEY

Nov. 15, 1960  G. J. BROWN  2,960,302
FLEXURE GIMBAL

Filed Oct. 29, 1957  6 Sheets-Sheet 3

George J. Brown
INVENTOR

BY Forrest J. Lilly

ATTORNEY

Nov. 15, 1960    G. J. BROWN    2,960,302
FLEXURE GIMBAL

Filed Oct. 29, 1957    6 Sheets-Sheet 4

George J. Brown
INVENTOR

BY Forrest J. Lilly

ATTORNEY

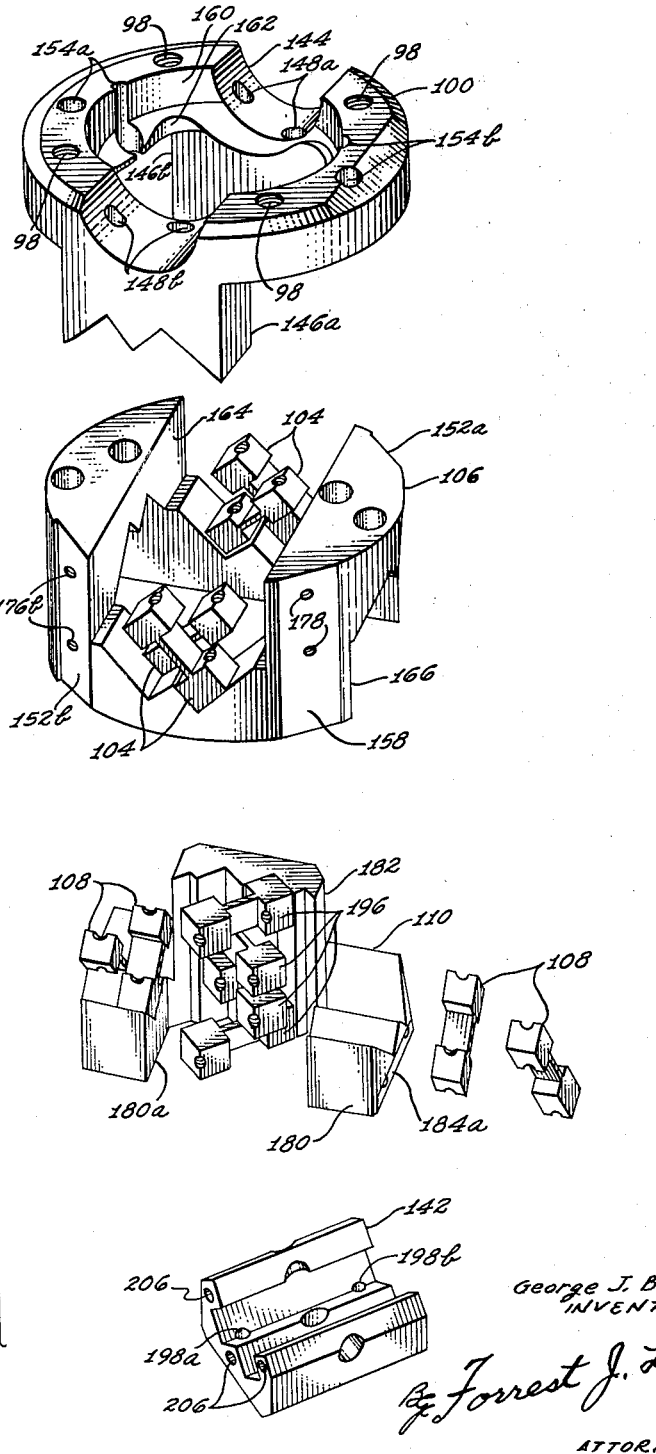

United States Patent Office 2,960,302
Patented Nov. 15, 1960

2,960,302

FLEXURE GIMBAL

George J. Brown, Pasadena, Calif., assignor to Hycon Mfg. Company, Pasadena, Calif., a corporation of Delaware Filed Oct. 29, 1957, Ser. No. 693,200

5 Claims. (Cl. 248—358)

The present invention relates generally to stabilized mounts for cameras and more particularly to a three axis, flexure supported gimbal.

When a camera is mounted and operated in a moving vehicle, the camera is normally subjected to all of the motions experienced by the vehicle. A photograph of a stationary object taken by the camera would reflect all of these motions in the picture. The resultant effect, of course, would be blurring of the picture due to relative motion between the camera and the stationary object or scene being photographed. Aerial cameras mounted in aircraft, for example, are often employed to photograph the terrain over which the aircraft flies. For each particular picture, the film in the camera is usually moved in the direction of flight at a rate which minimizes image motion on the film due to forward motion of the aircraft. This is conventional image motion compensation. However, blurring of the picture may still occur because of gyrations of the aircraft mounting the camera which introduces other, uncompensated relative motions. Of course, there is always the effect of vibration and other oscillatory motions on the camera.

Stabilized platforms or steady mounts are provided to isolate the camera, for example, from disturbing aircraft motions particularly when an exposure is made. Such mounts are also employed to rotate the camera about a pitch axis at a constant rate to compensate for image motion due to the forward velocity of the aircraft, when an exposure is made. These platforms or mounts are supported on a suitable gimbal system having usually three degrees of freedom so that a camera mounted on it can be rotated about a pitch axis, roll axis and yaw axis. The camera is moved by torquers (torque motors) which are responsive to motion detecting means which sense motion about any of the three axes. The conventional gimbal rings mounted on bearings introduce a good deal of friction such that system response can be spotty and faulty.

It is an object of this invention to provide an extremely low friction torque gimbal.

Another object of the invention is to provide a novel three axis, flexure supported gimbal.

Another object of the invention is to provide a compact gimbal capable of supporting heavy loads without introducing frictional resistance.

A further object of this invention is to provide a three axis, flexure supported gimbal having a wide range of motion about any axis.

Briefly, the foregoing and other objects are preferably accomplished by providing a normally upper cylindrical ring-shaped body having two diametrically dependent side flanges which fit into an upper channel cut diametrically across a cylindrical middle body, each side flange being supported on a pair of crossed flexures connecting with the middle body. The middle body has a lower channel cut diametrically at right angles to the upper channel, the top part of the lower channel intersecting with the bottom part of the upper channel to form an axial center opening through the middle body. A channel shaped lower body having an upright center pillar fits in the lower channel of the middle body such that the pillar extends upwards through the axial center opening of the middle body. The middle body is supported on two sets of flexures, each set of crossed flexures respectively connecting the ends of the channel shaped lower body to the middle body at the ends of the lower channel thereof. A center support column structure, which is a channel shaped bar, is positioned parallel to the upright center pillar of the lower body and extends up through the middle body's axial center opening and through the upper, ring-shaped body. The center support column structure is connected to the upright pillar of the lower body through two sets of crossed flexures.

The top of the center support column structure can be fastened to aircraft structure, for example, and a camera can be adapted to be mounted and secured to the upper body such that the intersection of the planes of the first set of crossed flexures define a pitch axis, the second set a roll axis and the third set a yaw axis. Each pair of crossed flexures can be thin metal strips which are mounted near together with the planes of the flexures being normally perpendicular to each other. The flexures can be of uniform thickness, have a tapered cross section or otherwise varied to secure desirable or suitable characteristics.

This invention possesses numerous other objects and features, some of which together with the foregoing, will be set forth in the following detailed description of a preferred embodiment of the invention, and the invention will be more fully understood by reading the description with joint reference to the attached drawings, in which.

Figure 8:
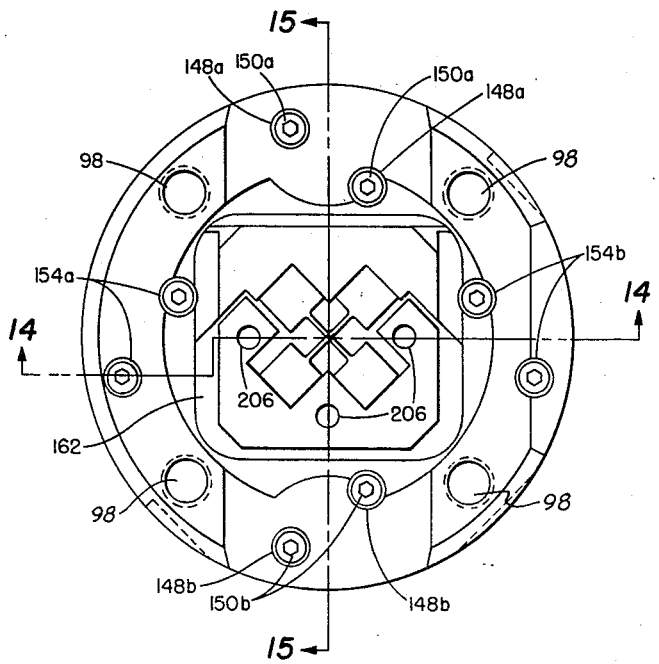
Figure 8 is a top plan view of the flexure gimbal.
Figure 9:
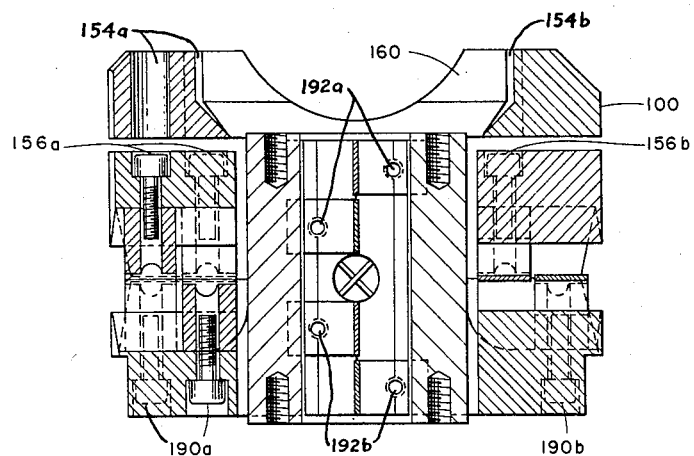
Figure 10:
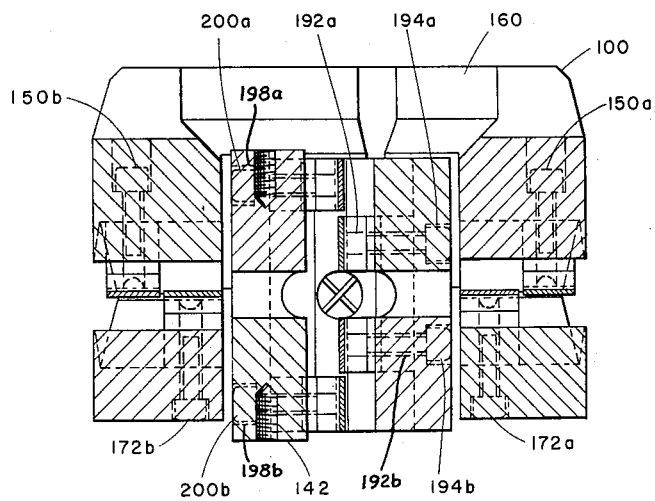

Figures 9 and 10 are sectional views taken along the lines 14—14 and 15—15, respectively, in Figure 8; and Figure 11 is an exploded view of the three axis, flexure supported gimbal.

Figure 1:
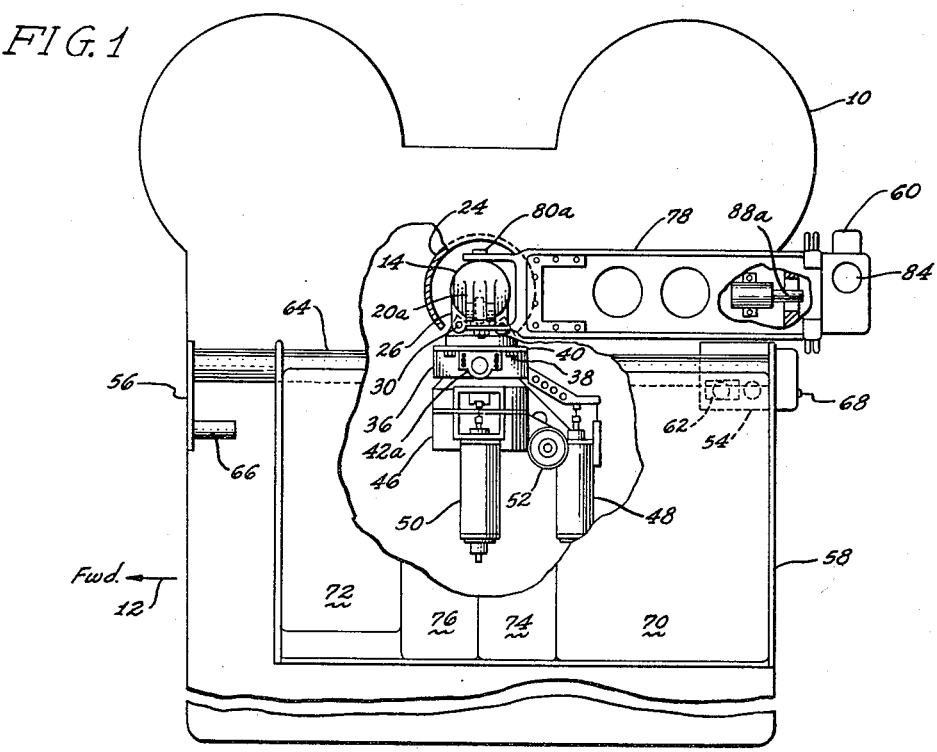
Figure 1 is a side view of a camera being supported on a stabilized mount of preferred construction.
Figure 2:
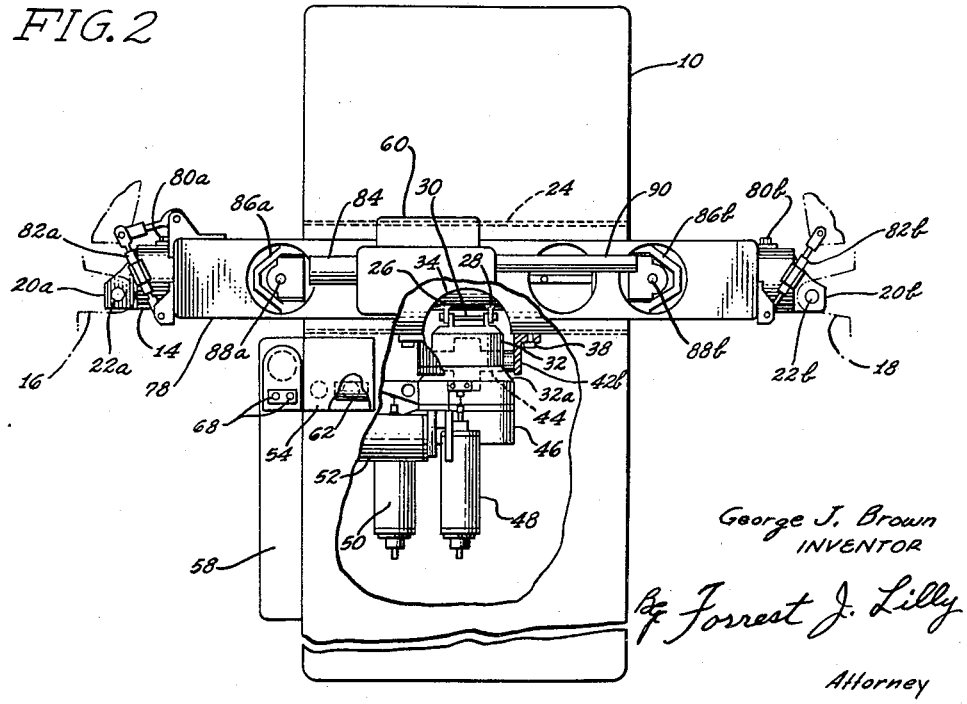
Figure 2 is a rear view of the supported camera of Figure 1.

Figures 1 and 2 are simplified drawings which illustrate a general arrangement in which a camera 10 can be mounted on a preferred embodiment of the invention. The camera 10 is shown only in outline form for clarity of illustration and the camera 10 in this instance is depicted as being mounted in an aircraft, for example. Figure 1 is a side view of the camera mounted so that the forward end of the aircraft is to the left, as indicated by arrow 12 and the view shown in Figure 2 is that looking forward from behind the camera 10. The camera 10 is a conventional aerial camera for taking pictures of the terrain over which the aircraft flies. The optical elements of the camera 10 are suitably arranged to look downward at the ground which is towards the bottom of the sheet in the illustrations of Figures 1 and 2. The camera 10 is conventional but is structurally adapted to fit on the stabilized mount.

A tube 14 is mounted transversely in the aircraft between a left wall flange 16 and a right wall flange 18. Both ends of the tube 14 are each terminated in a pair of parallel ears 20a and 20b, between which the flanges 16 and 18 extend and are each secured thereto by bolts 22a and 22b (Figure 2). Thus, aircraft structure is effectively extended from one wall to the other in the form of a tube 14. This tube 14 passes transversely through the body of the camera 10 through a tunnel formed by a larger tube 24, concentric with tube 14 and which is integrally a part of the camera 10. The camera 10 literally surrounds the tube 14, in this instance.

The inner tube 14 has two dependent flanges 26 and 28 (Figure 2) which are parallel to each other and lie in planes that intersect the wall of the inner tube 14 at right angles. Each flange 26 or 28 is equidistantly spaced on opposite sides near the middle of the length of tube 14, and have two holes in each through which two bolts 30 can be passed parallel to the axis of tube 14. These bolts 30 attach and secure a "ball joint" structure 32 having flaring lower sides 32a to the inner tube 14 which is effectively aircraft structure. The larger, outer tube 24 has a lower central cutout 34 which permits the ball joint structure 32 to reach the inner tube 14, and the outer tube 24 is attached and secured to a cylindrical ring member 36 by four bolts 38 which pass through holes in tab flanges 40 of the cylindrical member 36. The cylindrical member 36 has two diametrically opposed end plates 42a and 42b which are affixed to the cylindrical member 36, and each end plate has a circular cut therein which mounts trunnions of a cross shaped trunnion member 44. The ends of the trunnions are welded to the end plates at the circular cuts. This trunnion member 44 is connected through a three axis, flexure supported gimbal 46 to the ball joint structure 32. Thus, the camera 10 is supported by way of outer tube 24, cylindrical member 36, trunnion member 44, flexure supported gimbal 46, ball joint structure 32, and finally inner tube 14, which is fixed aircraft structure.

The camera 10 is supported on flexures; however, a safety ball joint type support is provided by the lower edge of the cylindrical member 36 and the conically sloping side of ball joint structure 32. In the event of flexure failure, the camera 10 can be effectively supported by the lower edge of cylindrical member 36 resting against the lower flaring conical sides 32a of ball joint structure 32. In normal operation, these two surfaces have a nominal clearance of 0.020 inch, for example, and there is no contact between adjacent surfaces, and outer tube 24 is held concentric with the inner tube 14.

A three axis, flexure supported gimbal is provided on which a camera can be mounted and be oriented in any direction. The camera 10 can be moved about any of three axes by torquer solenoids which are mounted between gimbal rings so that each solenoid torques only about the axis on which it is mounted. A pitch solenoid 48, roll solenoid 50, and yaw solenoid 52 are mounted between gimbal rings generally as shown in Figures 1 and 2. The torquer solenoids are preferably two coil, linear solenoids that can either push or pull, depending upon which coil is energized. It is in effect two solenoids set back to back, and the core of a solenoid is tapered to give a nearly linear displacement characteristic. Ball bushings for linear motion are used to support the core in order to minimize friction. Tractive force is nearly linear over a working stroke of ±¼ inch from center position. A satisfactory and preferred two coil, push-pull leakage flux solenoid, type PPL–200–45, is commercially available and manufactured by American Solenoid Company, P.O. Box 65885, Los Angeles 65, California.

Torquing moments which can be produced by the solenoids in the mount, for example, are: roll—1 lb.-ft., yaw—1 lb.-ft., and pitch—1½ lb.-ft. This mount will isolate the camera from disturbing airframe rates up to 20 milliradians per second. Normal operating angular velocities about the three axes are: roll—0±0.3 milliradian per second, yaw—0±0.3 milliradian per second, and pitch—8 to 16±0.3 milliradians per second. These figures apply to a stabilized mount including camera having a weight of approximately 550 lbs., approximately 80 pounds of which are stabilizer components, and moment of inertia about the three axes as follows: roll—10 slug ft.$^2$, yaw—10 slug ft.$^2$, and pitch—20 slug ft.$^2$.

The point of suspension of camera mass by the flexure gimbal is located, for example, at 0.010 inch above the center of gravity. The camera mass as denoted here includes other major components of the camera stabilized mount such as a gyro assembly 54, autobalance assembly 56, and servo amplifier assembly 58 together with power supply. A captivator 60 or cager device is a major component which does not add to the camera mass since it is supported purely by aircraft structure. The gyro assembly 54 is a conventional assembly including three single axis rate gyros 62 which are mounted mutually perpendicular to each other and sense angular motion respectively about the three axes of the camera stabilized mount. Reeves hermetic integrating gyros, type HIG–5, for example, can be satisfactorily used in this application. A temperature controller for the gyros, gyro spin motor power supply and gyro signal generator power supply are included in the gyro assembly 54 and are also all conventional items.

An autobalance assembly 56 (Figure 1) is used to compensate for change in the static balance of the camera caused by transport of film from the camera supply reel onto the takeup reel. The autobalance assembly 56 includes a long tube 64 located along the length of the camera on one side, containing a movable weight that is actuated by a system of pulleys and a D.C. motor 66. Commands to shift the weight are derived from a stabilized mount servo circuit where error signals due to static unbalance are detected. The autobalance drive motor 66 is, for example, a 28 volt D.C. permanent magnet type motor that is reversible by switching polarity of the brushes. Limit switches are conventionally provided at both ends of the tube 64 to cut off the drive motor 66 if a condition exists where the weight is driven to an end of the tube 64. Manual operation can be accomplished by two auxiliary switches 68 located at one end of the tube 64.

Static unbalance of the camera causes it to drift in the direction of unbalance. Thus, a steady state error signal is present whenever the camera becomes unbalanced. This stabilization error is detected by the gyro sensors 62 and amplified by a servo amplifier. The amplified signal actuates a control relay which energizes the autobalance drive motor 66 to move a slug so as to compensate for unbalance of the camera. The weight of the slug is, for example, 3.75 lbs. and the compensation rate can be 0.67 in.-lb./sec. Compensation must take place only during the steady state portions of the stabilizing cycle; as transient rates caused by motion of the airframe at the time of uncaging, unequal reaction of captivator pins, and switching to image motion compensation, must not be used since they are not caused by the static unbalance of the camera.

The camera stabilized mount servo generally comprises three velocity servo channels; pitch, roll and yaw. Each channel is substantially independent electrically of the other two and each channel includes a rate gyro, gyro preamplifier, torquer amplifier, power amplifier and push-pull solenoid. These amplifiers are located mainly in container 70, and various electrical interconnections are made in junction box 72 (Figure 1). Two smaller containers 74 and 76 respectively contain a film drive servo and oblique servo. These servos are all mounted on one side of the camera 10 below the autobalance tube 64.

The captivator 60 or caging device includes a U-shaped frame 78 which cradles the camera 10 between two bracketing arms that are connected by a common cross member positioned to the rear of the camera 10. The ends of the two bracketing arms each terminate in the form of a yoke which embraces the outer end of the inner tube 14 and are secured to the inner tube by bolts 80a and 80b which pass through respective yokes and tube 14. The corners of the U-shaped frame member are supported by adjustable airframe attachment links 82a and 82b (Figure 2) which are arranged to provide self-aligning support for the U-shaped frame member 78 in spite of slight temperature expansion or contraction of the frame member, or the like. Thus, the U-shaped frame is supported purely by airframe structure.

The captivator 60 also includes a 400 c.p.s. 3 phase motor 84 which is used to drive a magnetic hysteresis clutch which, in turn, drives a crank through an output shaft (all not shown here) to operate a set of sliders 86a and 86b, uncaging the camera 10. The sliders 86a and 86b engage with a set of corresponding pins 88a and 88b which are mounted on shock absorbers, one on each side of the camera 10. The shock absorber pins 88a and 88b are respectively engaged by the captivator sliders 86a and 86b when the camera is caged. The output shaft which drives the crank that operates the set of sliders 86a and 86b is spring loaded through suitable gearing by a heavy coil spring in tube 90. This spring drives the sliders 86a and 86b together, caging the camera 10, whenever the magnetic clutch is de-energized or in the event of power failure to the 3 phase motor 84 which normally runs continuously. When the magnetic clutch is energized, the crank is rotated against the load of the heavy coil spring until a mechanical limit stop is contacted, and the clutch then slips until the end of the uncage part of the cycle. Each slider is preferably an aluminum casting that slides on nylon bushings on a pair of parallel ⅝ inch diameter steel shafts. Nylon snubbers are used on the surfaces of the slider contacting pins 88a and 88b to minimize shock load and wear. A spring loaded detent (not shown) is also provided so that the crank, when manually turned to its extreme uncage position, can be locked in this position by pressing the spring loaded detent in to engage an end of a half segment gear which is affixed to and drives the output shaft. The force due to the heavy coil spring transmitted through the half segment gear against the detent, holds the detent in position. The captivator 60 serves to recenter the camera 10 after an exposure cycle, for example, and it locks the camera 10 to the airframe when stabilization is not in process.

A normal sequence of operation is generally that as the aircraft flies over terrian where it is desired to photograph an area later along its flight path, film is first properly drawn in the camera 10 and it is then uncaged by energizing the magnetic hysteresis clutch which operates the crank and sliders of the captivator 60, permitting the camera 10 to rotate freely in all three axis about a point. Unless stabilized, the camera 10 would move uniformly at the same angular velocities possessed by the airframe at the instant of uncaging (laws of motion), to which the camera was caged. Upon uncaging, angular movement of the camera is stopped during a stabilization interval in which a viscous type of damping is provided to overdamp the camera 10 about each axis. Overdamping causes angular motion to cease in minimum time. The camera 10 is stopped with respect to gyro references, and the camera 10 is not influenced by aircraft motion. During the stabilization interval, angular motion about the roll, pitch and yaw axes cease. This is accomplished by three velocity type servos, one for each axis as was described earlier. Each servo channel includes a rate gyro which senses angular motion about its corresponding camera axis during the stabilization interval and during a later image motion compensation interval. The rate gyro output, after amplification, is fed to its channel torquer solenoid which exerts torque opposing the camera motion. Motion can be controlled within the resolution of the gyro which is about ⅓ milliradian per second, for example. By opposing angular motion with a torque proportional to angular velocity, a viscous type of damping is achieved. Since the camera is damped with respect to inertial space, it is not influenced by movement of the airframe.

At the same time that camera motion about all three axes is being stopped, the autobalance mechanism 56 is also put into operation during the stabilization interval as described before. After this interval, image motion compensation (I.M.C.) is started by introducing a pitch angular movement of the camera 10 to compensate for the forward motion of the aircraft, while roll and yaw motion of the camera 10 remain stopped. During the I.M.C. period, the camera 10 rotates about the pitch axis at a fixed rate which can be set by the pilot by manually adjusting a suitably calibrated potentiometer, for example, to introduce a rate command signal into the pitch servo channel. A pitch compensating angular motion of the camera 10 results since a velocity type servo can command any angular velocity, as well as zero rate. During the I.M.C. period, while the image of the area to be photographed is motionless, the camera shutter is operated by a pulse appearing during this interval. After shutter operation, the camera 10 can be captured and securely locked to the airframe again by de-energizing the magnetic clutch of the captivator 60. Power is also disconnected from the camera stabilized mount servo until the next cycle of operation. This completes a general description of a preferred embodiment and application of the invention.

The three axis, flexure supported gimbal 46 is illustrated in detail by Figures 3, 4, 5, 6, 7, 8, 9, 10 and 11. Four long bolts (not shown) which thread into four tapped holes 98 located in the top edges of an upper body 100 of the flexure supported gimbal 46, are used to secure the ball joint structure 32 to the upper body 100. The upper body 100 is supported and connected through two sets of pitch axis flexures 104 to a middle body 106 of the gimbal 46 and the middle body 106 is, in turn, supported and connected by two sets of roll axis flexures 108 to a lower body 110. The lower body 110 has a raised center core section which is connected to a center support column structure through two sets of yaw axis flexures that hold the center support column structure parallel with the lower body core section. Each set of flexures comprises two thin metal strips mounted side by side and crossed so that the planes of the two strips would intersect at 90 degrees if the strips were widened and extended into each other. A strip is terminated in cubes at each end which can be integral with the metal strip. The strips can be other than metal, of course, and do not have to be integral with the end cubes, but can be suitably secured to them. This forms a pivot with negligible friction and a very small amount of spring compliance. The pitch and roll axis flexures are, for example, .016 inch thick, ⁷⁄₁₆ inch wide and ½ inch long. The yaw axis flexures are the same width and length but have a tapering lengthwise cross section of .014 inch minimum thickness. The lengthwise cross sectional edges are elliptical and are .060 inch thick where they join with the end cubes. The top of the center support column structure has three threaded holes 206, triangularly spaced to coincide with three holes bored in the center of the trunnion member 44. The ball joint structure 32 has three larger holes, triangularly spaced, to permit passage and installation of three bolts which secure the trunnion member 44 to the center support column structure.

The end plates 42a and 42b are affixed to the cylindrical ring member 36. Since the end plates 42a and 42b are respectively welded to the ends of the two trunnions of the trunnion member 44, and the cylindrical ring member 36 is fastened by bolts 38 (Figure 2) through tab flanges 40 to the outer tube 24, which is integral with the camera 10, the camera 10 is thus supported on the three axis, flexure supported gimbal 46 and a safety "ball joint" type support is provided by the lower inner edge of cylindrical ring member 36 and the flaring conical lower side of ball joint structure 32.

The brackets that support the torquer solenoids are mounted between gimbal rings so that each solenoid torques only about the axis on which it is mounted. The pitch solenoid 48 is fastened dependently to a bracket which is, in turn, secured to an upper yoke (not shown). The upper yoke is attached to the middle body 106 by cap screws. The pitch solenoid 48 is connected to an upper bracket arm (not shown) through a circular flexure. The upper bracket arm is fastened to a lower side area of structure 32 by screws. A differential transformer (not shown) is also attached to the pitch solenoid bracket and is connected to the upper bracket arm by another circular flexure. This instrument is provided so that indication of angular displacement of the camera 10 about the pitch axis can be obtained.

The roll solenoid 50 is secured dependently from a bracket (not shown) which is attached to a lower yoke (not shown) secured to the lower body 110 by cap screws. The roll solenoid 50 is connected through a circular flexure (not shown) to a bracket (not shown) attached to the upper yoke. Thus, roll solenoid 50 is connected between the lower body 110 and middle body 106. The yaw solenoid 52 is mounted laterally to a bracket (not shown) which is also fastened to the lower yoke. The yaw solenoid 52 is connected by a circular flexure (not shown) to a bracket arm (not shown) which is attached to the bottom of the center support column member 142. Thus, the yaw solenoid 52 is connected between the lower body 110 and the center support column member 142 which is secured to the trunnion member 44 that effectively supports the camera 10.

Figure 3:
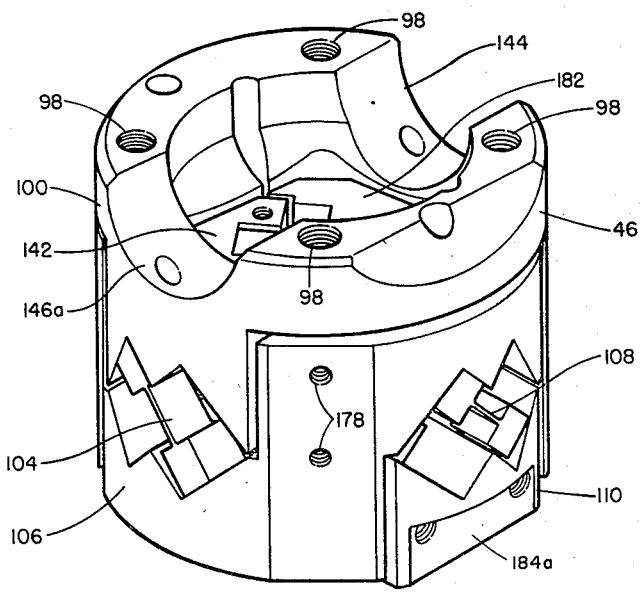
Figure 3 is a perspective of a three axis, flexure supported gimbal.

To show clearly how the solenoids are connected between gimbal rings, reference can be made to Figures 3, 4, 5, 6, 7, 8, 9, 10 and 11 which are detailed drawings of the flexure supported gimbal 46. Figure 11 is a perspective showing an exploded view of the flexure supported gimbal 46. The perspective of Figure 3 illustrates the general appearance of a preferred embodiment of a three axis, flexure supported gimbal. The three axis gimbal 46 comprises four main parts—an upper body 100, middle body 106, lower body 110 and a center support column member 142. The upper body 100 is a cylindrical ring-shaped structure having a large diametrical, circular cut 144 intersecting the side walls of the structure 100 partially below the top surface over two dependent side flanges 146a and 146b. This cut 144 provides clearance for the trunnions of the trunnion member 44. The four threaded holes 98 located around the top edges of the upper body 100 thread with bolts which secure the upper body 100 to ball joint structure 32 (and aircraft structure).

Figure 6:
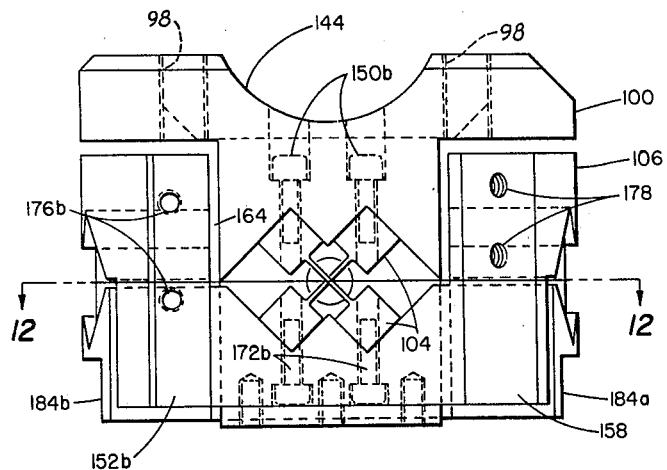
Figure 6 is a side elevation view of the flexure gimbal.

Two sets of countersunk holes 148a and 148b are also provided through the side flanges 146a and 146b as shown in Figures 6 and 8. These holes 148a and 148b accept screws 150a and 150b which thread into the upper cubical ends of the pitch axis flexures 104. These upper cubical ends are held by the screws 150a and 150b in the corners of the M shaped (Figure 6) lower edges of the side flanges 146a and 146b. Similarly, two other sets of holes 154a and 154b are drilled axially through the upper body 100 along the rim 90 degrees away from the holes 148a and 148b. These holes 154a and 154b provide through passage of screws 156a and 156b (Figures 4 and 9) which thread diagonally into the upper cubical ends 158a and 158b of the roll axis flexures 108. The upper body 100 has a large central opening 160 formed by boring parallel to the sides of the cylindrical upper body 100 partway down (Figures 9 and 10), spherically recessing the bottom and then reaming a rounded corner, square hole 162 (Figure 8) through the recessed area. This provides clearance for the raised core section of the lower body 110 and the center support column member 142.

Figure 4:
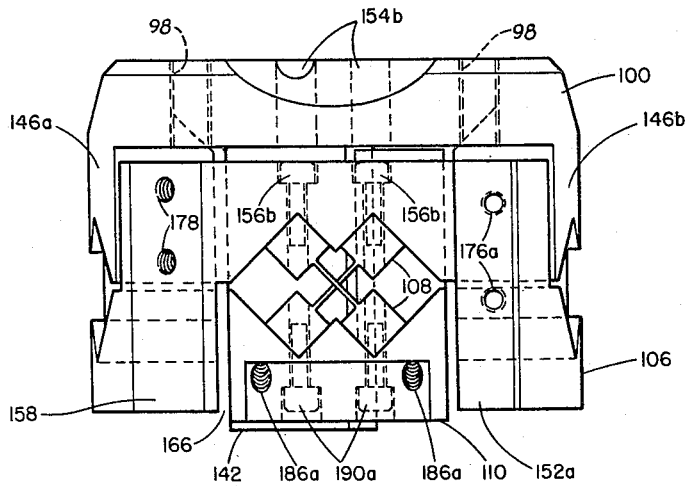
Figure 4 is an end elevation view of the flexure gimbal.

The middle body 106 is also generally cylindrical conforming (for cooperation) with that of the upper body 100. The middle body 106 is essentially a solid round cylinder having an upper channel 164 cut through the cylinder from the top surface and about halfway down the side, the bottom of the channel 164 forming a W-shaped edge (Figure 6). A lower channel 166 is similarly cut through the middle cylinder, the height of the channel 166 being from the bottom surface of the cylinder running up approximately halfway to the top, the channel 166 ending in a M-shaped groove (Figure 4). The lower channel 166 is oriented at right angles to the upper channel 164.

Countersunk holes in middle body 106 aligned with holes 154a and 154b accept the screws 156a and 156b (Figures 4 and 9) which thread into the upper cubical ends of the roll axis flexures 108, the cubical ends fitting into the corners of the top of the M-shaped channel 166. Similarly, two pairs of countersunk holes 170a and 170b (Figures 5 and 10) accept screw pairs 172a and 172b, respectively, which thread into the lower cubical ends of the pitch axis flexures 104. The lower cubical ends of these flexures 104 are held down in the corners of the W-shaped groove of the upper channel 164. Thus, the pitch axis flexures 104 connect the upper body 100 to the middle body 106 in an axis parallel to the upper channel 164.

Figure 7:
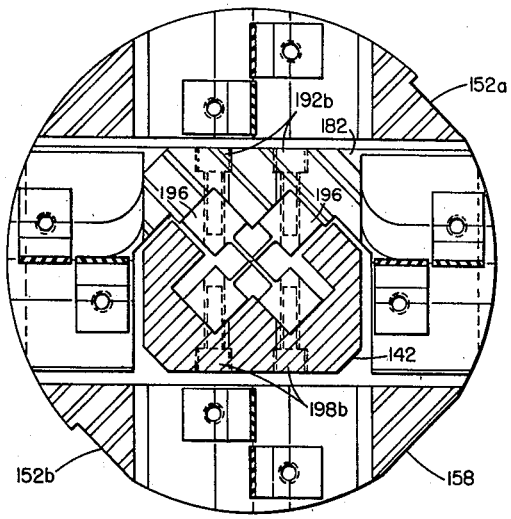
Figure 7 is a sectional view taken along the line 12—12 in Figure 6.

The middle body 106 has two notched, flat areas 152a and 152b and a flat area 158 (Figures 4, 6 and 7). The areas 152a, 152b and 158 can be milled flat for the length of the middle body cylinder as shown in Figure 6, for example. Threaded holes 176a, 176b and 178 are provided so that the formed ends and middle of the upper yoke can be fastened to the middle body 106 by cap screws.

Figure 5:
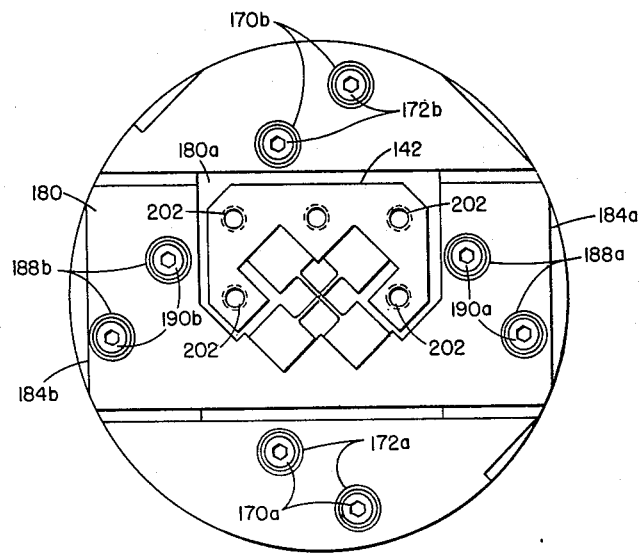
Figure 5 is a bottom view of the flexure gimbal.

The lower body 110 is generally a cross channel bar 180 (Figure 5) having an upper W-shaped surface (Figure 4) and an upright center core 182 perpendicular to the bar as shown in Figures 7 and 9. The channel bar 180 has a cutout area 180a (Figure 5), the inner profile of the cut 180a having a joggled W cross sectional edge identical to the inner surface of the upright center core 182, which is a direct pillar extension from the channel bar 180 (see Figure 7). The lower body 110 also has two flat areas 184a and 184b in which are located two pairs of threaded holes 186a and 186b, the latter pair not visible (Figures 4, 5 and 6). The ends of the lower yoke are fastened to these holes 186a and 186b by screws.

Two pairs of countersunk holes 188a and 188b are drilled in the bottom of the channel bar 180 near the two ends to receive screws 190a and 190b which thread into the lower cubical ends of the roll axis flexures 108 (Figures 4 and 5). Thus, a roll axis parallel to the axis of the channel bar 180 is defined by the line of intersection of adjacent planes of the roll flexures 108. Two pairs of countersunk holes 192a and 192b are also drilled through the upright center core 182 of the lower body 110 as shown in Figures 7 and 10. Since Figure 7 shows only the lower pair of yaw flexures, Figure 9 can be additionally referred to for exact location of the threaded holes 192a. Screw pairs 194a and 194b respectively fasten the upper and lower cubical ends of the yaw axis flexures 196 to the upright center core 182.

The center support column member 142 is a channel bar which has a W-shaped inner cross sectional edge in which the ends of the W are bent inwards, as can be seen in Figures 7 and 8. Two pairs of countersunk holes 198a and 198b are drilled through the center support column member 142 as shown in Figures 7 and 10. As before, Figure 9 can be used to determine the exact location of holes 198a which are on the same levels as holes 192a. Similarly, two pairs of screws 200a and 200b thread into the upper and lower cubical ends of the yaw axis flexures 196 through holes 198a and 198b, respectively. The yaw axis flexures 196 thus connect (and support) the center support column member 142 to the lower body 110. Four of five threaded holes 202 tapped in the bottom of the center support column member 142 (Figures 5 and 6) accept cap screws which secure the yaw solenoid connecting bracket arm to the center support column member 142. The three threaded holes 206 (Figure 8) in the top of the center support column member 142 receive the three bolts (not shown) which secure the trunnion member 44 to it. Thus, a yaw axis which is normally parallel to the axis of the center support column member 142 is defined by the intersection of the planes of the crossed yaw axis flexures 196a and 196b.

An extremely low friction three axis gimbal is thus provided. The flexure gimbal can have a very compact structure, and is capable of supporting a heavy load without introducing frictional resistance in any of the three axes of rotation. Stabilization of an aerial camera is possible to a very high degree with a flexure gimbal. The flexure supported gimbal can have a relatively wide range of motion about any axis, and image motion compensation can be accomplished easily and accurately with a camera mount incorporating a flexure gimbal. The flexure gimbal is ideal for use in a camera stabilized mount where precise control is desirable and necessary.

It is to be understood that the particular embodiment of the invention described above and shown in the attached drawings is merely illustrative of and not restrictive of the broad invention, and that various changes in design, structure and arrangement may be made without departing from the spirit and scope of the broader of the appended claims.

What is claimed is:

1. A flexure gimbal, comprising: a first body adapted to mount a load; a second body; a first pair of crossed flexures connecting said first body to said second body, said first pair of crossed flexures establishing a first axis of rotation for said gimbal; a third body; a second pair of crossed flexures connecting said second body to said third body, said second pair of crossed flexures establishing a second axis of rotation for said gimbal; a fourth body; and a third pair of crossed flexures connecting said third body to said fourth body, said third pair of crossed flexures establishing a third axis of rotation for said gimbal.

2. The invention according to claim 1 wherein each said pair of crossed flexures include at least two small thickness strips positioned adjacently lengthwise, the strips lying in planes which intersect at right angles to each other.

3. The invention according to claim 1 wherein said pairs of crossed flexures establishes three mutually orthogonal axes of rotation for said gimbal.

4. A three axis, flexure supported gimbal for mounting a camera or the like, comprising: a cylindrical ring-shaped upper body having a central opening and diametrically opposite dependent side flanges, said upper body being adapted to support said camera; a cylindrical middle body having an upper diametric channel and a lower diametric channel orthogonal to the upper channel and intersecting partially therewith to form a central opening; a first two pairs of crossed flexures connecting the dependent side flanges of said upper body to respective ends of the upper channel of said middle body, and defining a first axis of rotation; a channel bar shaped lower body having an upright center core; a second two pairs of crossed flexures connecting respective ends of the lower channel of said middle body to ends of said channel bar shaped lower body, and defining a second axis of rotation; a center support column member adapted to be secured to fixed structure; and a third two pairs of crossed flexures respectively connecting upper and lower ends of the upright center core to ends of said center support column, and defining a third axis of rotation, whereby said center support column member extends upwards through the central openings of said middle body and said upper body to attach with the fixed structure.

5. The invention according to claim 4 wherein the three axes of rotation respectively defined by said pairs of crossed flexures are mutually perpendicular and intersect in a pivot point for said gimbal.

References Cited in the file of this patent

UNITED STATES PATENTS

| | | |
|---|---|---|
| 2,517,612 | Varian | Aug. 8, 1950 |
| 2,611,659 | Hadley | Sept. 23, 1952 |
| 2,793,028 | Wheeler | May 21, 1957 |